(12) United States Patent
Collmer et al.

(10) Patent No.: US 9,387,586 B2
(45) Date of Patent: Jul. 12, 2016

(54) ROBOT TRANSMISSION WITH A PRESSURE COMPENSATION DEVICE

(75) Inventors: Andreas Collmer, Vaihingen (DE); Thomas Hezel, Asperg (DE)

(73) Assignee: Dürr Systems GmbH, Bietigheim-Bissingen (DE)

(*) Notice: Subject to any disclaimer, the term of this patent is extended or adjusted under 35 U.S.C. 154(b) by 375 days.

(21) Appl. No.: 13/984,404

(22) PCT Filed: Mar. 2, 2012

(86) PCT No.: PCT/EP2012/000944
§ 371 (c)(1),
(2), (4) Date: Oct. 21, 2013

(87) PCT Pub. No.: WO2012/116836
PCT Pub. Date: Sep. 7, 2012

(65) Prior Publication Data
US 2014/0034422 A1     Feb. 6, 2014

(30) Foreign Application Priority Data
Mar. 2, 2011   (DE) .................. 10 2011 012 809

(51) Int. Cl.
*F16H 57/027*   (2012.01)
*B25J 9/10*   (2006.01)
(Continued)

(52) U.S. Cl.
CPC .. *B25J 9/10* (2013.01); *B25J 9/102* (2013.01); *B25J 19/0062* (2013.01); *F16H 57/027* (2013.01); *F16H 57/045* (2013.01)

(58) Field of Classification Search
CPC .......... B25J 9/10; B25J 9/102; B25J 19/0062; F16H 57/027; F16H 57/045
USPC .......................................................... 184/106
See application file for complete search history.

(56) References Cited

U.S. PATENT DOCUMENTS

| 1,888,150 A | * | 11/1932 | Walker | ............... | B01D 46/10 |
| | | | | | 55/486 |
| 1,940,601 A | * | 12/1933 | McCrery | ............... | B65D 39/082 |
| | | | | | 220/203.17 |
| 3,003,659 A | * | 10/1961 | Miller | ............... | B67D 1/045 |
| | | | | | 137/207 |

(Continued)

FOREIGN PATENT DOCUMENTS

| DE | 3923530 A1 | 1/1990 |
| DE | 280369 A1 | 7/1990 |

(Continued)

*Primary Examiner* — Michael Riegelman
(74) *Attorney, Agent, or Firm* — Bejin Bieneman PLC

(57) ABSTRACT

The invention relates to a robot transmission (1) for a multi-axis robot, in particular for a painting robot or a hand-held robot of a painting system for painting motor vehicle body components. Said transmission comprises a transmission housing (6) which is filled, when in operation, at least partially with a lubricant according to an operationally-dependent lubricant pressure, in order to lubricate the robot transmission (1), and has a construction-defined maximum pressure for the lubrication pressure. The transmission housing (6) is not air-tight if the lubrication pressure in the transmission housing (6) exceeds the maximum pressure. According to the invention, the robot transmission also comprises a pressure compensation device (7) which compensates the pressure in the transmission housing (6) and thus prevents the lubrication pressure in the transmission housing (6) from exceeding the maximum pressure.

9 Claims, 5 Drawing Sheets

Figure 1:
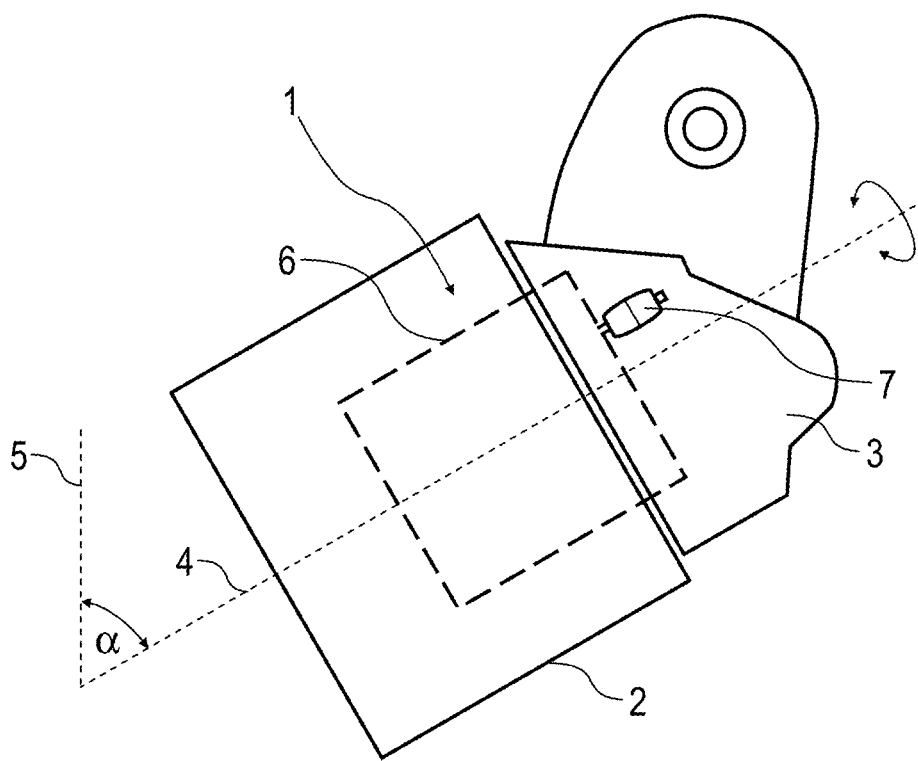

(51) Int. Cl.
*B25J 19/00* (2006.01)
*F16H 57/04* (2010.01)

(56) References Cited

U.S. PATENT DOCUMENTS

| | | | | |
|---|---|---|---|---|
| 3,326,230 | A * | 6/1967 | Frank | F16K 24/04 137/199 |
| 5,125,428 | A | 6/1992 | Rauter | |
| 5,215,312 | A * | 6/1993 | Knappe | F16H 57/027 137/197 |
| 5,386,883 | A * | 2/1995 | Graf | F16N 11/10 184/108 |
| 5,522,769 | A * | 6/1996 | DeGuiseppi | F16H 57/027 454/270 |
| 5,914,415 | A * | 6/1999 | Tago | B01D 19/0031 55/385.1 |
| 6,701,220 | B1 | 3/2004 | Lundstrom et al. | |
| 2008/0128210 | A1* | 6/2008 | Lieske | F01M 1/16 184/6.5 |
| 2009/0235630 | A1* | 9/2009 | Norris | F02C 7/06 60/39.08 |
| 2010/0032242 | A1* | 2/2010 | Lin | F01M 13/00 184/6.12 |
| 2011/0014371 | A1 | 1/2011 | Herre et al. | |
| 2011/0030983 | A1* | 2/2011 | Kakiuchi | B25D 17/245 173/46 |
| 2014/0048149 | A1* | 2/2014 | Sakraschinsky | F16H 57/027 137/177 |

FOREIGN PATENT DOCUMENTS

| | | |
|---|---|---|
| DE | 60005824 T2 | 8/2004 |
| DE | 102006060865 A1 | 7/2007 |
| DE | 102007026338 A1 | 12/2008 |
| DE | 102008037035 A1 | 2/2010 |
| JP | 2006038019 A | 2/2006 |
| JP | 2007310808 A | 11/2007 |

* cited by examiner

ROBOT TRANSMISSION WITH A PRESSURE COMPENSATION DEVICE

A robot gear may be provided for a multi-axis robot, in particular for a painting robot, or for a handling robot of a painting installation for painting motor vehicle body components.

In modern painting installations for painting of motor vehicle body components, multi-axis robots are used namely, on the one hand, as painting robots for paint application and, on the other hand, as handling robots (e.g. hood openers, door openers) for handling the components to be painted. Such robots have a plurality of robot gears for the movement of the individual robot axles, which are usually lubricated with oil. For this purpose, the gear box of the respective robot gear is partially filled with oil.

On the one hand, the oil level must be high enough inside the gear box to that all components to be lubricated are located below the oil level and, therefore, are sufficiently lubricated.

On the other hand, the oil level inside the closed gear box must be low enough that sufficient gas volume is still available above the oil level in the gear box to allow expansion of the oil in the gear box in the event of an operation-dependent heating of the oil. It is accordingly known to fill the gear box for such robot gear only to 80% with oil, so that 20% of the gear box remains filled with air to allow expansion of the oil. This is important because pressure increases due to thermal expansion of the oil can lead to leakage of the gear box, because the gear box gaskets withstand only very low overpressures.

The problem with such partial filling of the gear box is that, possibly, all components to be lubricated are no longer located below the oil level in case of change of the spatial position of the robot gear, whereby the lubrication is impaired. This problem is serious in particular for a robot gear, since the spatial position of the robot gear generally changes in operation for a highly mobile multi-axis robot, so that partial filling of the gear box leads to an unsatisfactory lubrication.

A possible solution to this problem includes moving from oil lubrication to grease lubrication, which, however, is not always possible.

Another possible solution includes increasing the fill level of the oil in the gear box, so that, regardless of the spatial position of the robot gear, all components to be lubricated are always below the oil level. The oil level in the gear box can, however, not be increased in any desired manner, because the remaining air volume in the closed gear box must be sufficient for allowing thermally induced expansion of the oil.

Pressure compensation vessels such as are known, are formed as a closed system and can be connected with the gear box to allow pressure compensation, which would then also allow a complete filling of the gear box with oil. But such pressure compensation vessels generally have a resilient separation element (e.g. a membrane), which separates a lubricant side from a gas side in the pressure compensation vessel. The lubricant side of the pressure compensation vessel is in this case fluidically connected with the gear box so that the oil contained in the gear box can expand into the lubricant side of the pressure compensation vessel in the event of heating, wherein the resilient separation element deforms accordingly. The internal volume of the closed pressure compensation vessel must in this case be sufficiently large on the gas side so that, in the event of thermally induced expansion of the oil, no excessive back pressure is established on the gas side, which back pressure would exceed the construction and design related pressure maximum of the gear box. Thus, the oil pressure in the gear box must not exceed, for example, a pressure value of 0.3 bar, this resulting, when taking into account a safety of 0.2 bar, in a pressure maximum of 0.1 bar. With the known closed pressure compensation vessel, this could only be achieved when the internal volume of the pressure compensation vessel on the gas side is at least 1000 cm$^3$. The resulting construction size of the pressure compensation vessel prevents, however, the use for a robot gear of a paint or handling robot, because the available construction space is not sufficient for this purpose. The use of a closed pressure compensation vessel is therefore likewise not suitable to solve the above-mentioned problem of the thermally induced expansion of the oil.

Beyond this, pressure compensation devices are known for stationary or quasi-stationary gears, which prevent overpressure in the gear box. Such pressure compensation devices include, for example, ventilation with a device (e.g. filter, back-pressure valve), which prevents the entry of dirt into the gear box. Such pressure compensation devices are, however, not suitable for robot gears for which the spatial position in operation is subject to strong fluctuations.

DE 600 05 824 T2 describes an industrial robot with a gear box, wherein the gear box has simple ventilation openings, so that the problem of overpressure in the gear box does not occur at all. However, there is in this case the risk that gear oil will flow out through the ventilation opening and pollute the environment. This would be undesirable in particular for use as a painting robot, because dirt would necessarily have to be avoided during any painting operation. This known industrial robot is therefore not used as a painting robot.

Reference is also made to DE 39 23 530 A1, DE 10 2006 060 865 A1 and DE 10 2007 026 338 A1 concerning the prior art.

Therefore, an improved robot gear is needed.

Disclosed herein is a robot gear with a pressure compensation device, which allows pressure compensation in the gear box and thereby prevents the lubricant pressure in the gear box from exceeding the pressure maximum. In distinction from known closed pressure compensation vessels such as described above, the presently disclosed pressure compensation device includes a pressure compensation vessel, which is formed as an open system and which allows gas exchange with the environment. This offers the advantage that the internal volume of the pressure compensation vessel on the gas side can be substantially smaller than previously possible, so that the construction size of the pressure compensation vessel can be reduced accordingly. The smaller construction size of pressure compensation vessels, which are formed as open systems, advantageously allows the constructional integration in a multi-axis robot. In contrast thereto, one could not use prior closed pressure compensation vessels due to their construction size.

The pressure compensation device thus may include a pressure compensation vessel, which is fluidically connected with the gear box and into which the lubricant can expand in the event of heating. For example, the pressure compensation vessel can be directly screwed to the gear box. However, it is also possible that the pressure compensation vessel is separated from the gear box and connected fluidically with the gear box merely through a line. Preferably, the pressure compensation vessel is, however, directly arranged on the gear box to keep the line volume between the gear box and the pressure compensation vessel as small as possible.

The pressure compensation vessel may include a resilient separation element (e.g. an elastic membrane), which separates a lubricant side from a gas side in the pressure compensation vessel and seals the lubricant side against the gas side.

The lubricant side of the pressure compensation vessel is in this case fluidically connected with the gear box so that the lubricant contained in the gear box can expand into the lubricant side of the pressure compensation vessel in the event of heating. During operation, both the gear box and also the lubricant side of the pressure compensation vessel may therefore be completely filled with lubricant, wherein thermally induced expansion of the lubricant is compensated for by a corresponding movement of the resilient separation element. The gas side of the pressure compensation vessel is in contrast—differing from the known closed pressure compensation vessel described at the beginning—connected with the environment, which allows gas exchange between the gas side of the pressure compensation vessel and the ambient atmosphere.

In case of a thermally induced expansion of the lubricant, the resilient separation element is thus deformed in the pressure compensation vessel in the direction of the gas side, wherein air is exhausted from the gas side of the pressure compensation vessel into the environment.

During subsequent cooling of the lubricant, the lubricant constricts again, which leads to a corresponding movement of the resilient separation element in the direction of the lubricant side, wherein air is aspired from the environment side into the gas side of the pressure compensation vessel.

An advantage of this open design of the pressure compensation vessel includes that the expansion of the lubricant does not lead to a corresponding back pressure on the gas side of the pressure compensation vessel because a pressure compensation with the ambient atmosphere is possible. In operation, there are therefore hardly any overpressures within the gear box over a relatively large temperature range (e.g. 10° C.-80° C.) of the lubricant, whereby overpressure-related leakage is prevented in the gear box.

In an exemplary embodiment, the pressure compensation vessel has on the gas side an external opening through which the gas side of the pressure compensation vessel connects with the ambient atmosphere. In this case, the external opening of the pressure compensation vessel may be closed by means of a pressure compensation element, wherein the pressure compensation element is gas-permeable to allow gas exchange between the gas side of the pressure compensation vessel and the ambient atmosphere. However, the pressure compensation element in the external opening of the pressure compensation vessel may be impermeable for the lubricant to prevent leakage of the lubricant even in the event of failure of the separation element between the lubricant side and the atmosphere side of the pressure compensation vessel. Thus, if the resilient separation element in the pressure compensation vessel between the lubricant side and the gas side fails, there is a leakage of the lubricant from the lubricant side into the gas side of the pressure compensation vessel. The pressure compensation element in the external opening of the pressure compensation vessel then prevents, however, lubricant flow out of the pressure compensation vessel. As a result, the pressure compensation vessel in this exemplary embodiment has a double leakage safety system.

The pressure compensation element is in this case may be realized such that a leakage-related lubricant impingement on the pressure compensation element is visually recognizable from the outside. This allows, by a simple visual inspection, checking for a proper state of the resilient separation element in the pressure compensation vessel. For example, the pressure compensation element in the external opening of the pressure compensation vessel can be formed as an elastic membrane, which can include a fabric. In this case, it is possible that the membrane is transparent, so that a leakage-related lubricant impingement of the membrane is visually recognizable to allow a simple visual inspection.

It should also be mentioned that the pressure compensation element in the external opening of the pressure compensation vessel may be bidirectionally gas-permeable to allow pressure compensation both for cooling of the lubricant and also for heating of the lubricant in such a way that a gas exchange with the surroundings takes place.

The separation element in the pressure compensation vessel between the lubricant side and the gas side can, for instance, be an elastic membrane, which may also be bidirectionally resilient to allow pressure compensation both for cooling of the lubricant and also for heating of the lubricant.

The pressure compensation capability of the pressure compensation vessel is in this case restricted by the maximum deformation of the resilient separation element in the pressure compensation vessel. Thus, the separation element in the pressure compensation vessel has, due to its construction and design, a specific maximum displacement because, for example, an elastic membrane cannot be deflected in any desired manner. Beyond this, the lubricant has a temperature-dependent expansion volume, which increases with the lubricant temperature. The separation element may be realized in such a manner that the displacement of the separation element is greater than the expansion volume of the lubricant even at high temperatures of the lubricant. A pressure compensation up to a lubricant temperature of 50° C., 60° C., 70° C. or even 80° C. is possible in this way.

It should also be mentioned that the gear box is not only sensitive against overpressures, but also against underpressures. Such underpressures can, for example, occur during cooling when the lubricant in the gear box accordingly constricts due to the cooling. The pressure compensation device therefore may also prevent the lubricant pressure in the gear box from falling below a construction and design-related pressure minimum.

It was already mentioned above that the gear box for the robot gear according to the invention may be completely filled with the lubricant so that the robot gear components to be lubricated are always covered with the lubricant regardless of the spatial position of the robot gear. In further embodiments, robot gears may be designed for which the gear box is only partially filled with the lubricant. For example, the gear box can be filled to at least 85%, 90% or at least 95% with the lubricant, wherein, however, other filling grades are also possible.

It should also be mentioned that the construction and design related pressure maximum of the gear box is, with reference to an atmospheric pressure, preferably smaller than +0.3 bar, +0.2 bar or +0.1 bar, whereas the construction and design related pressure minimum of the gear box is, with reference to an atmospheric pressure, preferably greater than −0.3 bar, −0.2 bar or −0.1 bar.

Throughout the present description, it is assumed that the lubricant is a liquid gear oil. Other types of lubricant are possible in the context of the disclosed embodiments.

Beyond this, it should also be mentioned that the pressure compensation vessel for the pressure compensation device may include a volume of less than 200 cm$^3$, 100 cm$^3$, 50 cm$^3$ or even less than 30 cm$^3$. This is advantageous because the pressure compensation vessel can then be structurally integrated in the robot due to its small construction size.

It should furthermore be noted that the pressure compensation device may be impermeable for the lubricant to prevent any outflow of the lubricant from the gear box.

Some embodiments encompass a complete robot (e.g. painting robot or handling robot) with at least such a robot gear as described herein.

In this case, the pressure compensation device according to the invention may be arranged inside the robot, for example in a swivel joint of the robot. The pressure compensation device thus may not protrude over the outer contour of the robot.

In another embodiment, the robot has a plurality of robot gears, which are jointly connected with a pressure compensation device of the type described above.

Figure 2A:
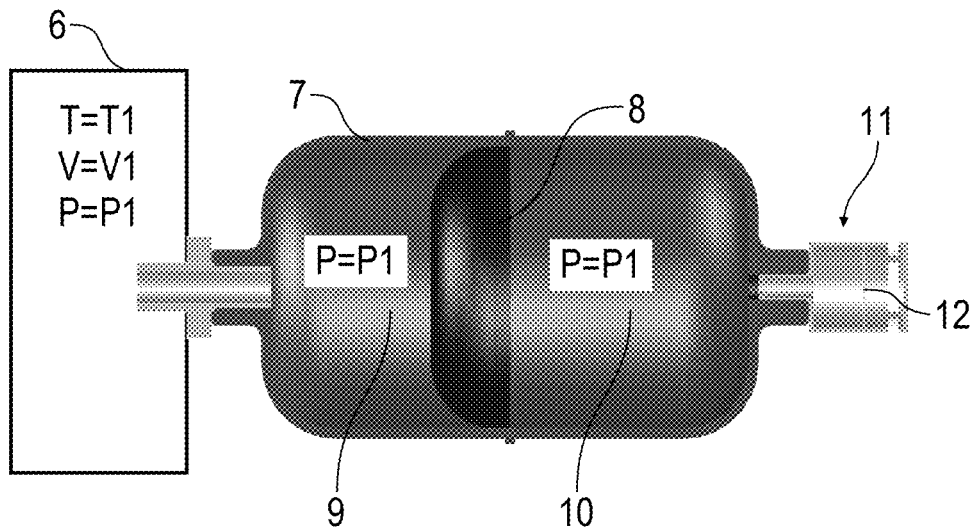
Figure 2B:
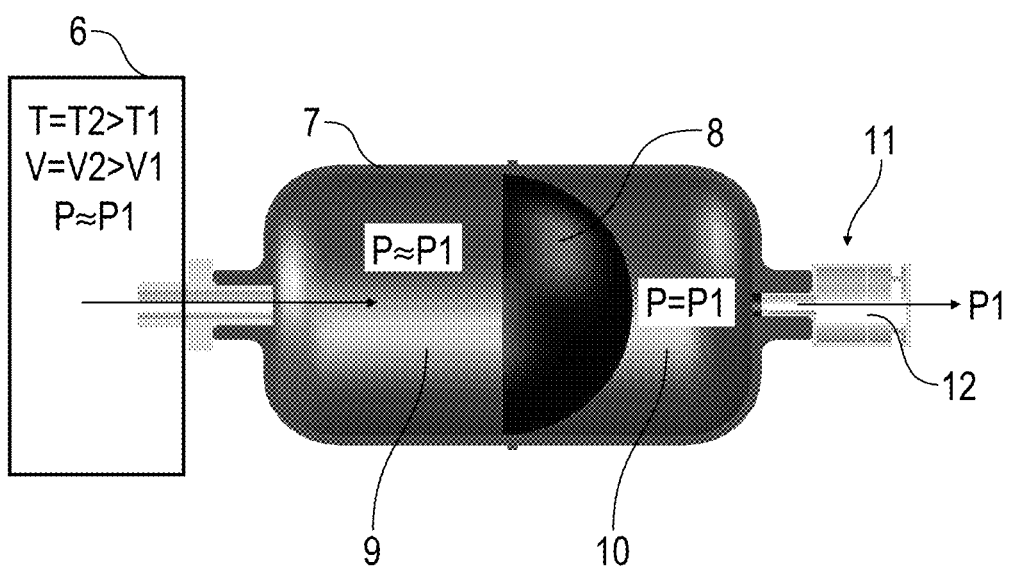
Figure 3:
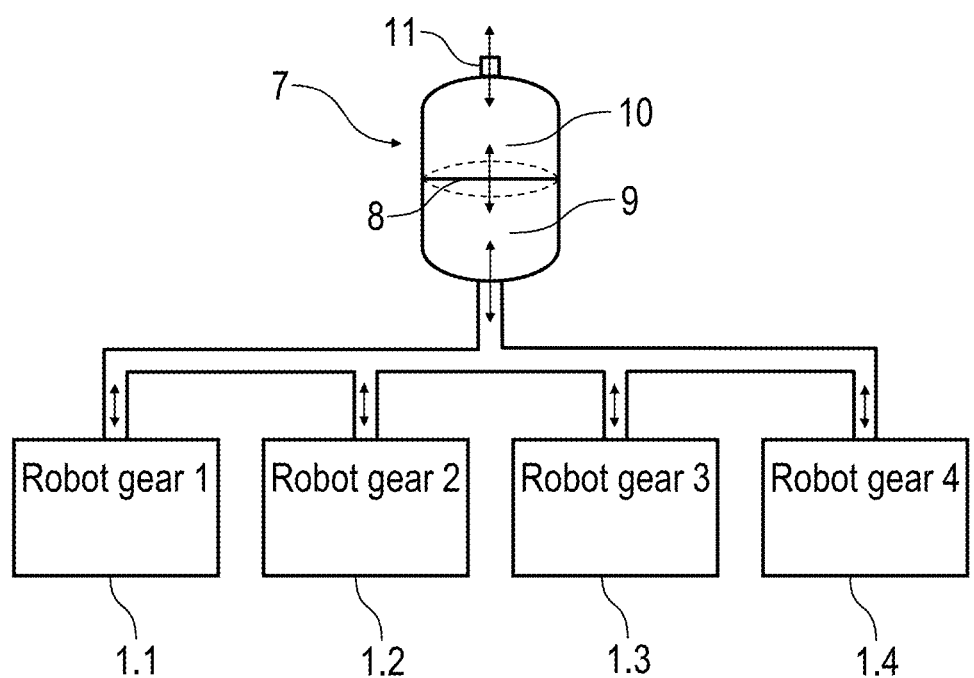
Figure 4:
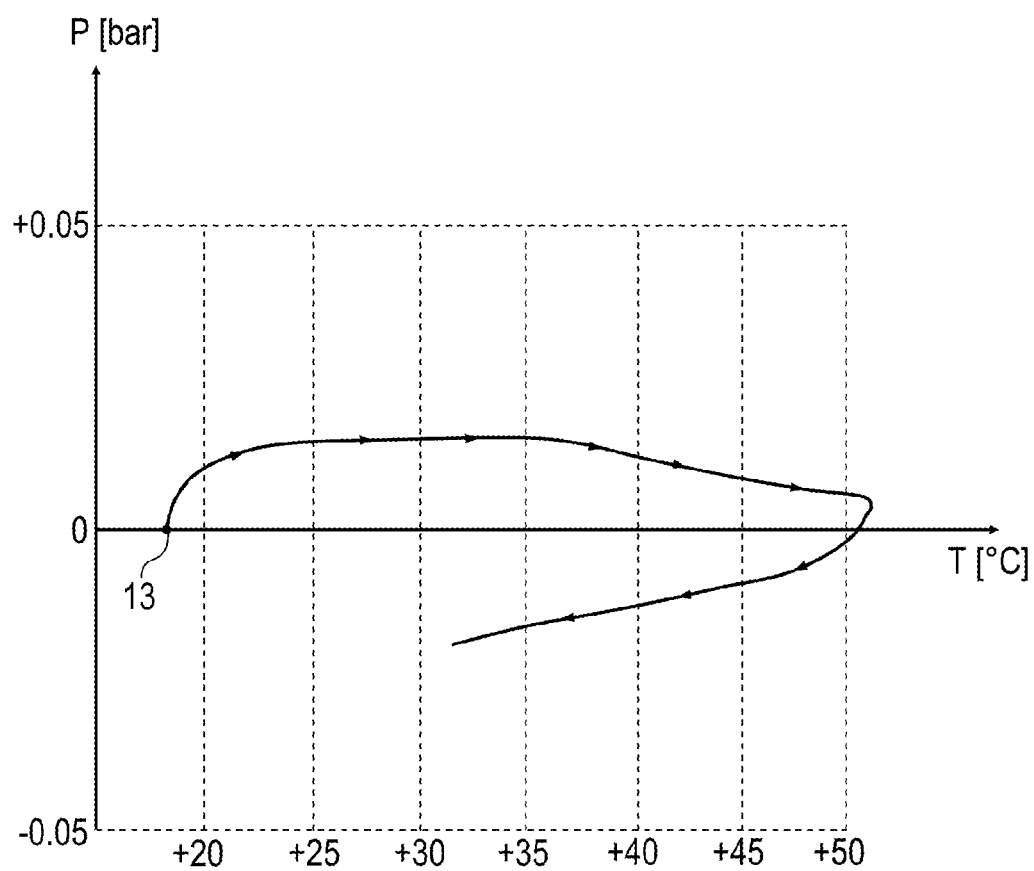
Figure 5:
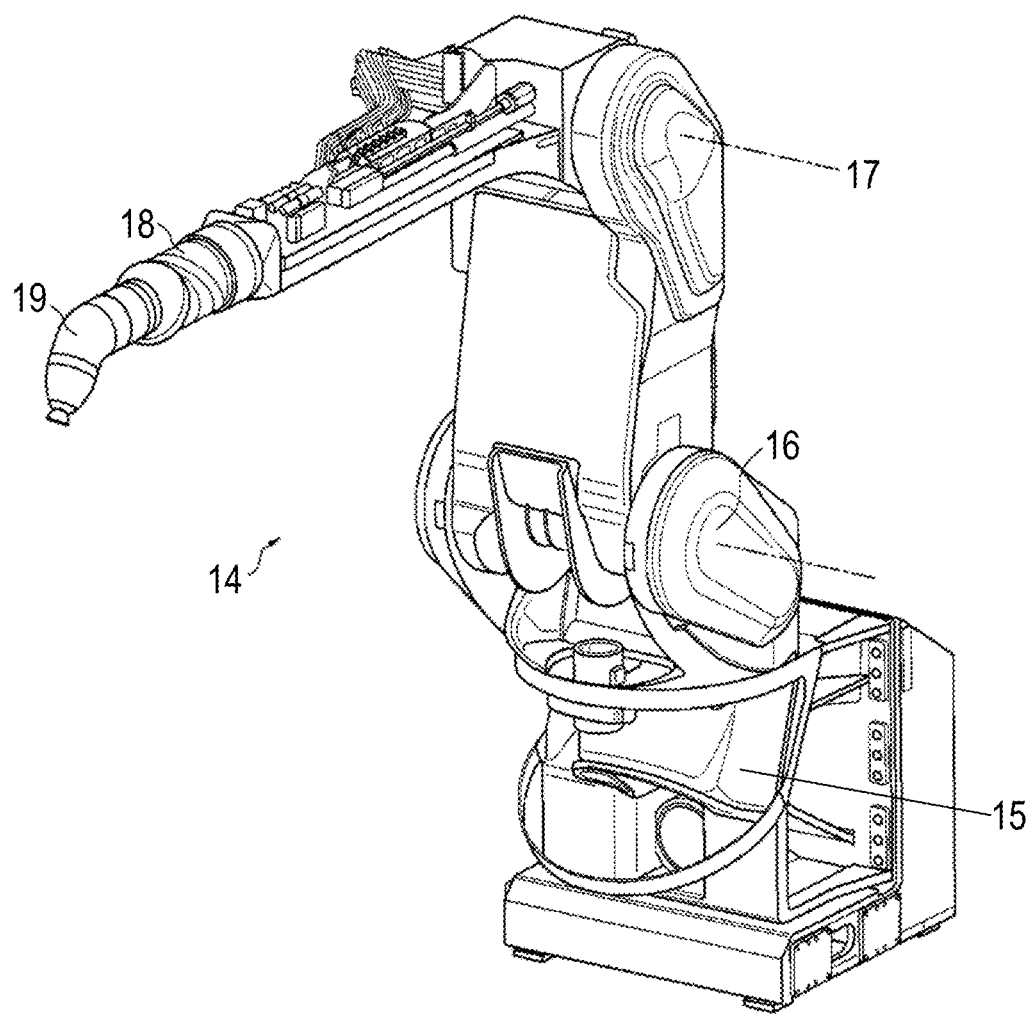

Other advantageous further developments are explained in greater detail below in conjunction with the description of the preferred exemplary embodiments and with reference to the figures. The figures show as follows:

FIG. 1 a schematic representation of an exemplary robot gear with a pressure compensation device, FIGS. 2A and 2B different operating states of an exemplary pressure compensation device, FIG. 3 a schematic modification of an exemplary pressure compensation device according to the invention, which is connected with a plurality of robot gears, FIG. 4 a graph for clarifying the pressure curve in the gear box of the robot gear in the event of a change of the lubricant temperature, and FIG. 5 a perspective view of a painting robot, in which a robot gear according to the invention can be used.

FIG. 1 shows a schematic representation of a robot gear 1 between two axes 2, 3 of a multi-axis robot, which can be used in a painting installation for painting of motor vehicle body components, for example, as a painting robot or as a handling robot.

The robot gear 1 allows in this case a rotation of the axis 3 relative to the axis 2 about a rotation axis 4.

The rotation axis 4 is in this case angled by an angle α relative to a vertical line 5 to clearly show that, in operation, different spatial orientations of the robot gear 1 are possible, which is significant for the lubrication of the robot gear 1, as will be explained in greater detail below.

The robot gear 1 has a gear box 6 represented by a dashed line, which is completely filled with a gear oil during operation. In operation, however, friction-related heat is generated in the robot gear 1, which leads to heating of the gear box and to a corresponding expansion of the gear. The gear box 6, however, allows only a low overpressure and also only a low underpressure because, otherwise, loss of tightness and leakage of the gear oil contained in the gear box 6 could possibly occur. When taking into account a sufficient safety, the gear box 6 therefore has, due to its construction and design, an admissible pressure maximum of +0.1 bar and an admissible pressure minimum of −0.1 bar with reference to the atmospheric pressure.

For meeting these pressure values, a pressure compensation device is provided for, which comprises a pressure compensation vessel 7, which is screw-fastened with the gear box 6 and fluidically connected with the gear box 6 so that the gear oil contained in the gear box 6 can expand into the pressure compensation vessel 7 in the event of heating.

The exact structure of the pressure compensation vessel 7 and its mode of operation are now explained in the following with reference to FIGS. 2A and 2B.

A resilient separation element 8 shaped as an elastic membrane is located in the pressure compensation vessel 7, wherein the resilient separation element 8 subdivides the internal volume of the pressure compensation vessel 7 in a lubricant side 9 and a gas side 10 and thereby seals the lubricant side 9 against the gas side 10.

The lubricant side 9 of the pressure compensation vessel 7 is in this case connected with the gear box 6 so that the gear oil contained in the gear box 6 can expand into the lubricant side 9 of the pressure compensation vessel 7 in the event of heating.

The gas side 10 of the pressure compensation vessel 7 is in contrast connected via a pressure compensation element 11 with the ambient atmosphere, wherein the pressure compensation element 11 allows a gas exchange between the gas side 10 of the pressure compensation vessel 7 and the ambient atmosphere. For this purpose, the pressure compensation element 11 has a fabric membrane 12, which is gas-permeable to allow the above-mentioned gas exchange between the gas side 10 of the pressure compensation vessel 7 and the ambient atmosphere.

The fabric membrane 12 is, however, impermeable for liquids, so that the fabric membrane 12 prevents, in the cases of a failure of the resilient separation element 8 in the pressure compensation vessel 7, and of leakage of lubricant from the lubricant side 9 into the gas side of the pressure compensation vessel 7, the lubricant from flowing out of the pressure compensation vessel 7. The pressure compensation vessel 7 thus offers a double leakage safety system with the resilient separation element 8 and with the fabric membrane 12.

FIG. 2A shows in this case an initial state of the pressure compensation device prior to start of operations. The lubricant in the gear box 6 then has a lubricant temperature $T=T1$ and a lubricant volume $V=V1$ as well as a lubricant pressure $P=P1$. The lubricant pressure P1 is then also established in the pressure compensation vessel 7 both on the lubricant side 9 and also on the gas side 10, wherein the lubricant pressure P1 corresponds to the atmospheric pressure.

During operation, the lubricant temperature then rises up to a value $T=T2>T1$, as is represented in FIG. 2B. Due to this warming, the lubricant volume V increases and reaches a value $V=V2>V1$. The lubricant thus expands into the pressure compensation vessel 7, which leads to a corresponding deformation of the liquid-tight resilient separation element 8 in the direction of the gas side 10. In this case, the resilient separation element 8 generates only a negligible back pressure, so that the lubricant pressure P in the gear box 6 is still approximately equal to its initial value P1.

This consequence is also due to the fact that the deformation of the resilient separation element 8 in the pressure compensation vessel 7 leads to that air is exhausted from the gas side 10 through the fabric membrane 12 of the pressure compensation element 11, so that no back pressure is established on the gas side 10 of the pressure compensation vessel 7.

As a result, the pressure compensation device according to the invention allows a pressure compensation without a substantial back pressure being established in the pressure compensation vessel 7. The lubricant pressure P in the gear box 6 therefore remains within the construction and design related admissible pressure limits even in the event of a heating of the robot gear 1.

FIG. 3 shows a modification of the exemplary embodiments described above, wherein the modification widely conforms with the exemplary embodiment described above, such that, to avoid repetition, reference is made to the above description, the same reference signs being used for corresponding details.

A particularity of this exemplary embodiment consists in the fact that the pressure compensation vessel 7 is fluidically connected with a total of four robot gears 1.1-1.4 to effect a pressure compensation in the associated gear boxes of the individual robot gears 1.1-1.4. In this case, the pressure compensation vessel 7 is thus responsible for a plurality of gear boxes.

FIG. 4 shows schematically the curve of the overpressure P in the gear box 6 depending on the lubricant temperature T in the gear box 6.

From a starting point 13 with ambient temperature and accordingly no overpressure in the gear box 6, the lubricant temperature T first increases due to the friction, which occurs in operation in the robot gear 1, which also leads to a corresponding increase of the lubricant pressure P in the gear box 6. The increase of the lubricant pressure P is then, however, limited by the pressure compensation device according to the invention to an acceptable value, which is far below the construction and design related pressure maximum $P_{MAX}=0.1$ bar. After shut-down of the robot, the lubricant temperature T then drops again, which leads to a corresponding decrease in the lubricant pressure P. In this case, too, the pressure compensation device according to the invention, however, limits the pressure decrease, so that the pressure does not fall below the construction and design related pressure minimum $P_{MIN}=-0.1$.

FIG. 5 shows a perspective view of a painting robot 14 according to the invention with a plurality of movable axes 15, 16, 17, a robot hand axis 18 and a rotary atomizer 19 as an application unit.

The individual axes 15-17 are in this case driven by robot gears, which are not shown, wherein the individual robot gears have such pressure compensation devices as were described above.

With respect to the further details and the mode of operation of the painting robot 14, reference is made to the patent application DE 10 2008 037 035 A1, whose content is to be fully incorporated in the present description in its entirety by reference.

The invention is not limited to the preferred exemplary embodiments described above. Instead, a plurality of variants and modifications is possible, which also make use of the concept of the invention and therefore fall within the scope of protection. Furthermore, the invention also claims protection for the subject-matter and the features of the subclaims without the features of the claims to which they refer.

The invention claimed is:

1. A multi-axis robot having a plurality of separate axes, the multi-axis robot comprising:
    a first gear box associated with a first robot axis, the first gear box configured to be filled at least in part during operation with a lubricant at an operation-dependent lubricant pressure;
    a second gear box associated with a second robot axis, the second gear box configured to be filled at least in part during operation with the lubricant at the operation-dependent lubricant pressure;
    a pressure compensation vessel fluidly connected to the first and second gear boxes and configured to allow pressure compensation in the gear boxes, the vessel having a lubricant side and a gas side, the lubricant side and gas side separated by a resilient separation element and the gas side being exposed to ambient pressure.

2. The robot of claim 1, wherein the pressure compensation device is arranged inside the robot.

3. The robot of claim 1, wherein the pressure compensation device is arranged in a swivel joint of the robot.

4. The robot of claim 1, wherein:
    the gas side of the pressure compensation vessel is connected with an ambient atmosphere through an external opening;
    the external opening of the pressure compensation vessel is configured to be closed by a pressure compensation element;
    the pressure compensation element is gas-permeable, thereby allowing pressure compensation between the gear boxes and the ambient atmosphere; and
    the pressure compensation element is impermeable by the lubricant, thereby preventing leakage of the lubricant even upon failure of the separation element between the lubricant side and the gas side of the pressure compensation vessel.

5. The robot of claim 4, wherein the pressure compensation element is configured such that a gearbox-side lubricant impingement at the pressure compensation element is visually recognizable from outside the robot gear.

6. The robot of claim 4, wherein the pressure compensation element is an elastic membrane.

7. The robot of claim 6, wherein the membrane consists of a woven fabric.

8. The robot of claim 6, wherein the membrane is transparent, whereby, upon a failure of the separation element in the pressure compensation vessel between the lubricant side and the gas side, a lubricant impingement of the membrane due to leakage is visually recognizable.

9. The robot of claim 4, wherein the pressure compensation element is bidirectionally gas-permeable, thereby allowing pressure compensation for cooling the lubricant and also for heating the lubricant.

* * * * *